(12) United States Patent
Takakura et al.

(10) Patent No.: US 8,016,340 B2
(45) Date of Patent: Sep. 13, 2011

(54) FLOOR SPACER FOR VEHICLE

(75) Inventors: Shinji Takakura, Ibaraki (JP); Ayumi Hiraishi, Ibaraki (JP); Isao Suzuki, Saitama (JP)

(73) Assignee: Sekisui Plastics Co., Ltd., Osaka (JP)

( * ) Notice: Subject to any disclaimer, the term of this patent is extended or adjusted under 35 U.S.C. 154(b) by 285 days.

(21) Appl. No.: 12/226,665

(22) PCT Filed: Apr. 24, 2007

(86) PCT No.: PCT/JP2007/058779
§ 371 (c)(1),
(2), (4) Date: Oct. 24, 2008

(87) PCT Pub. No.: WO2007/125881
PCT Pub. Date: Nov. 8, 2007

(65) Prior Publication Data
US 2010/0060038 A1    Mar. 11, 2010

(30) Foreign Application Priority Data

Apr. 27, 2006  (JP) ................. 2006-123464
Oct. 11, 2006  (JP) ................. 2006-277838

(51) Int. Cl.
*B60N 3/04*    (2006.01)
*B62D 25/20*   (2006.01)
(52) U.S. Cl. ............. 296/39.3; 296/193.07; 296/97.23
(58) Field of Classification Search ............... 296/39.1, 296/39.3, 191, 193.07, 75, 97.23
See application file for complete search history.

(56) References Cited

U.S. PATENT DOCUMENTS

| | | | |
|---|---|---|---|
| 2,057,873 A * | 10/1936 | Atwood | 428/40.1 |
| 5,171,619 A | 12/1992 | Reuben | |
| 5,245,141 A | 9/1993 | Fortez et al. | |
| 5,266,374 A * | 11/1993 | Ogata | 428/77 |
| 5,892,187 A * | 4/1999 | Patrick | 181/286 |

(Continued)

FOREIGN PATENT DOCUMENTS

CN  1755044 A  4/2006

(Continued)

OTHER PUBLICATIONS

International Search Report mailed on Jun. 12, 2007.

(Continued)

*Primary Examiner* — Jason S Morrow
(74) *Attorney, Agent, or Firm* — Rader, Fishman & Grauer PLLC

(57) ABSTRACT

A floor spacer for a vehicle constituted of an expanded resin molded article which can simultaneously satisfy sound absorbing performance while satisfying desired compression strength and reduction in weight is provided. A floor spacer A for a vehicle is constituted of a floor spacer main body 10 constituted of an expanded resin molded article having flat plate portions 12a and 12b to be on an inner side of a compartment, and a plurality of ridges 13a and 13b vertically provided at back surfaces of the flat plate portions 12a and 12b on a floor frame side, and a layer constituted of a sound absorbing material 20 formed to fill spaces 14a and 14b formed between the aforesaid ridges 13a and 13b. Through-holes 15 may be formed in the flat plate portions 12a and 12b of the floor spacer main body 10, and fastening holes 16 which a part of the sound absorbing material 20 enters may be formed in the ridges 13a and 13b.

5 Claims, 9 Drawing Sheets

U.S. PATENT DOCUMENTS

| | | | | |
|---|---|---|---|---|
| 6,033,003 | A * | 3/2000 | Bell et al. | 296/37.3 |
| 7,011,181 | B2 * | 3/2006 | Albin, Jr. | 181/290 |
| 7,249,654 | B2 * | 7/2007 | Nakamoto et al. | 181/290 |
| 2004/0115420 | A1 * | 6/2004 | Schoemann | 428/317.9 |
| 2006/0080941 | A1 | 4/2006 | Ishii et al. | |

FOREIGN PATENT DOCUMENTS

| | | |
|---|---|---|
| DE | 102 22 074 A1 | 12/2003 |
| EP | 0 309 777 A1 | 4/1989 |
| EP | 1 647 454 A1 | 4/2006 |
| JP | 02-261613 A | 10/1990 |
| JP | 2001-047924 A | 2/2001 |
| JP | 2003-127796 A | 5/2003 |
| JP | 2004-338504 A | 12/2004 |
| JP | 2005-132188 A | 5/2005 |
| JP | 2005-160990 A | 6/2005 |

OTHER PUBLICATIONS

Extended European Search Report, App. No. 07742214.5-1523/2014514, PCT/JP2007058779, Mar. 25, 2009 (3 pages).

* cited by examiner (a)

(b)

FLOOR SPACER FOR VEHICLE

TECHNICAL FIELD

The present invention relates to a floor spacer for a vehicle which is used for the purpose of ensuring flatness of a floor surface of the vehicle and the like.

BACKGROUND ART

It is known to accommodate and dispose a floor spacer for a vehicle constituted of an expanded resin molded article in a recessed groove existing in a floor frame of the vehicle in order to ensure flatness of a floor surface of a vehicle, in order to enhance sound absorbing performance, in order to protect an occupant against an impact occurring inside and outside the vehicle, or for the purpose of reducing the weight or the like. An expanded resin molded article such as a polystyrene resin foam generally has less sound absorption characteristic and hardly has the sound absorbing performance in itself. Therefore, when high sound absorbing performance is required from the viewpoint of increasing amenity of the vehicle interior, what is made by bonding felt or the like which functions as a sound absorbing material to the expanded resin molded article in the post-processing is used as the floor spacer for a vehicle.

A solid expanded resin molded article generally has high compression strength with a light weight, and therefore, is effective as the floor spacer for a vehicle of a thickness of about 40 mm to 150 mm. Further, as shown in FIG. 10, Patent Document 1 describes a floor spacer 1 of hard foamed plastic having a horizontal portion 2a corresponding to a floor surface forming a foot part of an occupant seat of an automobile, and an inclined portion 2b which is laid forward of the foot part, in which the horizontal portion 2a and the inclined portion 2b on the inside of the compartment are both made flat plate portions 2, and those on a floor surface side are of a ridge structure 3 such as a honeycomb structure, a slit structure or a projection structure.

Patent Document 1: JP Patent Publication (Kokai) No. 2003-127796

DISCLOSURE OF THE INVENTION

Problem to be Solved by the Invention

Even in the floor spacer for a vehicle of the structure in which the inside of the compartment is the flat plate portion, and on the floor frame side, a plurality of ridges are vertically provided at the back surface of the flat plate portion as the floor spacer of the mode shown in FIG. 10, it is required to bond felt or the like as a sound absorbing material for the purpose of enhancing sound absorbing performance. When high sound absorbing performance is required, felt of a thickness of about 20 mm to 60 mm has been conventionally required, but when the felt of such a thickness is bonded, reduction in compression strength due to the felt cannot be ignored, and reduction in amenity is likely to be caused due to large sinkage.

The present invention is made in view of the circumstances as described above, and has an object to provide a floor spacer for a vehicle constituted of an expanded resin molded article which can satisfy sound absorbing performance at the same time while satisfying desired compression strength and reduction in weight in a floor spacer for a vehicle.

Means for Solving the Problem

A floor spacer for a vehicle according to the present invention is a floor spacer for a vehicle which is accommodated and placed in a recessed groove existing in a floor frame of a vehicle, and characterized by including at least a floor spacer main body constituted of an expanded resin molded article having a flat plate portion to be on an inner side of a compartment, and a plurality of ridges vertically provided at a back surface of the aforesaid flat plate portion, and a layer constituted of a sound absorbing material disposed to fill a space formed between the aforesaid ridges.

In the floor spacer for a vehicle according to the present invention, the floor spacer main body constituted of an expanded resin molded article is a flat plate portion on the inner side of the compartment, and the object to ensure flatness of the floor surface of the vehicle can be achieved. Further, the floor frame side of the floor spacer main body has the constitution in which a plurality of ridges are vertically provided at the back surface of the flat plate portion, and by properly setting the contact area of all the ridges to the floor frame in consideration of the compression strength required of the floor spacer for a vehicle, the floor spacer for a vehicle which satisfies the compression strength while satisfying reduction in weight can be provided.

Further, in the floor spacer for a vehicle according to the present invention, the layer constituted of the sound absorbing material is formed in the spaces formed between the aforesaid ridges of the floor spacer main body so as to fill the spaces. The layer constituted of the sound absorbing material functions as a sound absorbing wall which prevents sound occurring outside the compartment from entering the compartment, and therefore, high sound absorbing performance can be ensured for the vehicle interior. The floor spacer in which the sound absorbing material such as felt is bonded to the back surface as the conventional floor spacer for a vehicle contacts the floor frame via the sound absorbing material, but since in the floor spacer for a vehicle according to the present invention, the ridge of the floor spacer main body directly contacts the floor frame, the compression strength which is set in advance for the floor spacer for a vehicle does not change (reduce) even if the layer constituted of the sound absorbing material which is an easily compressible material. Therefore, high sound absorbing performance can be simultaneously included while the compression strength is satisfied.

In another mode of the floor spacer for a vehicle according to the present invention, a plurality of through-holes are formed in the aforesaid flat plate portion in the floor spacer main body. By forming the through-holes, the noise on the inner side of the compartment is passed through the through-holes and can be absorbed by the layer constituted of the sound absorbing layer, and therefore, sound absorbing performance of the floor spacer for a vehicle with respect to the sound in the compartment can be also enhanced.

In another mode of the floor spacer for a vehicle according to the present invention, fastening holes in a direction along the flat plate portion are formed in all or some of the aforesaid plurality of ridges in the floor spacer main body. The fastening hole is used for stably holding the layer which is constituted of the sound absorbing material disposed to fill the space formed between the aforesaid ridges, in its position. More specifically, in a preferable mode of the floor spacer for a vehicle according to the present invention, a part of the layer constituted of the sound absorbing material enters the aforesaid fastening hole formed in the aforesaid ridge, and the layer constituted of the sound absorbing material is reliably inhibited from dropping due to vibration or the like.

In the present invention, the floor spacer main body can be made of an optional expanded resin molded article, but is preferably an expanded molded article of thermoplastic resin beads. The examples of the thermoplastic resin include a polystyrene resin, a polyolefin resin (for example, a polypropylene resin, and a polyethylene resin), a polyester resin (for example, polyethylene terephthalate, polybutylene terephthalate, and polyethylene naphthalate), a polycarbonate resin and the like.

Above all, a styrene-modified polyolefin resin obtained by impregnating a styrene monomer into a polyolefin resin particle and polymerizing it, expandable beads of a styrene-modified polyethylene resin are especially preferably used. The reason is that the molding of a styrene-modified polyolefin resin is excellent in size stability and shape retention as compared with a polypropylene resin and a polystyrene resin, and powder due to abrasion hardly occurs as compared with a polystyrene resin. Further, this is because an expanded molded article of polyethylene resin beads or polypropylene resin beads have a high size shrinkage rate of the entire molding, the size accuracy is hardly obtained as compared with the expanded molded article of styrene-modified polyolefin resin beads, and secondary foaming power is small.

When a styrene-modified polyolefin resin is used, the ratio of the styrene component is 40 to 90 weight %, preferably 50 to 85 weight %, and more preferably 55 to 75 weight %. When the ratio of the styrene component is less than 40 weight %, the material strength (compression strength) significantly reduces, and therefore, sufficiently wide spaces for disposing the sound absorbing material cannot be formed between the ridges. When the ratio exceeds 90 weight %, there arises the problem of occurrence of abrasion sound with the body (vehicle body panel) of the automobile similarly to the polystyrene resin monomer.

On molding the floor spacer main body, the thermoplastic resin such as the above described styrene-modified polyethylene resin, for example, is impregnated with a blowing agent to prepare an expandable thermoplastic resin, and by pre-expanding the expandable thermoplastic resin with heating steam or the like within the range of the expansion ratio of 3 to 70, pre-expanded beads are produced. Next, the pre-expanded beads are filled in the cavity of the molding die, and is foam-molded by steam heating or the like. The expansion ratio at the time of expansion molding is 3 to 70. As the blowing agent, butane, propane or the like can be used.

In the present invention, the sound absorbing material constituting the layer constituted of the sound absorbing material is not especially limited, and the one generally used in the field of the automobile can be properly used. More specifically, the examples of the sound absorbing material include felt (for example, what is obtained by solidifying miscellaneous recovered materials such as cotton, chemical fiber and the like with PET), a polyurethane foam, non-woven fabric, what is obtained by solidifying recycled materials of the vehicle members (ground products of urethane, cotton, chemical fiber and the like) with a PET resin, fibrillated fiber and animal-plant fiber materials, glass wool, an asphalt foam, and the like. Above all, felt, a polyurethane foam or non-woven fabric is preferable, and among them, non-woven fabric (Thinsulate (trade name)) constituted of a high-performance wadding material is preferable.

The entire shape of the floor spacer for a vehicle according to the present invention is optional under the condition that the floor spacer main body has the flat plate portions and a plurality of ridges are vertically provided at the back surfaces, and the examples of the shape include the shape simply forming the horizontal portion at the time of being placed in the vehicle, the shape including the inclined portion where the feet of an occupant are placed at the tip end of the horizontal portion as shown in FIG. 10, and the like. In the case of the latter, a plurality of ridges are vertically provided on the back surfaces of both the flat plate portions constituting the horizontal portion and the inclined portion. The ridge may be in a circular column shape or a rectangular column shape, and may be in the shape forming a slit as shown as an example in FIG. 10. In any case, the spaces are formed between the ridges, and therefore, the layer constituted of the aforementioned sound absorbing material is formed to fill the spaces.

In the floor spacer for a vehicle according to the present invention, the layer constituted of the aforesaid sound absorbing material may be formed to fill all the spaces formed between the ridges, or may be formed to fill some of the spaces formed between the ridges. Either one is selected in consideration of the sound absorbing performance required of the vehicle and the sound absorbing performance of the sound absorbing material in use. In the case of the latter, if the layer constituted of the sound absorbing material is formed on the back surface of the flat plate portion so that some of the spaces formed between the ridges remain, the remaining spaces perform the sound absorbing function (sound attenuating function), and the sound absorbing performance can be further enhanced.

The mode of mounting the sound absorbing material to the spaces formed between the ridges is optional, and is not specially limited. The mode using an adhesive, the mode using a suitable fastener such as a staple and the like may be adopted. However, considering the operation efficiency at the time of mounting, the mode in which the layer constituted of the sound absorbing material is formed by holding the sound absorbing material in a predetermined position by only the contact between the sound absorbing material and the ridges is the most preferable. The mode brings about the advantage of being able to easily separate and collect the floor spacer main body portion and the sound absorbing material of the different kinds of materials when the floor spacer for a vehicle is discarded and the like, in addition to increase in the working efficiency at the time of mounting the sound absorbing material. As described above, when the fastening holes in the direction along the flat plate portion are formed in all or a part of the aforesaid plurality of rides in the floor spacer main body, a part of the sound absorbing material is caused to enter the fastening hole, whereby the sound absorbing material can be more stably mounted in the spaces formed between the ridges.

Advantage of the Invention

According to the present invention, a floor spacer for a vehicle constituted of an expanded resin molded article which can simultaneously satisfy sound absorbing performance while satisfying desired compression strength and reduction in weight can be obtained.

BRIEF DESCRIPTION OF THE DRAWINGS

FIG. 9 is a view for explaining an assembling state of the floor spacer for a vehicle shown in FIG. 8a.

DESCRIPTION OF SYMBOLS

A . . . floor spacer for a vehicle, 10 . . . floor spacer main body, 11a . . . horizontal portion, 11b . . . inclined portion, 12a, 12b . . . flat plate portion, 13a, 13b . . . ridge, 14a, 14b . . . space between ridges, 15 . . . through-hole, 16 . . . fastening hole, 20 . . . sound absorbing material, 25 . . . tongue piece, 24, 26, 27 . . . cut line

BEST MODE FOR CARRYING OUT THE INVENTION

Figure 1:
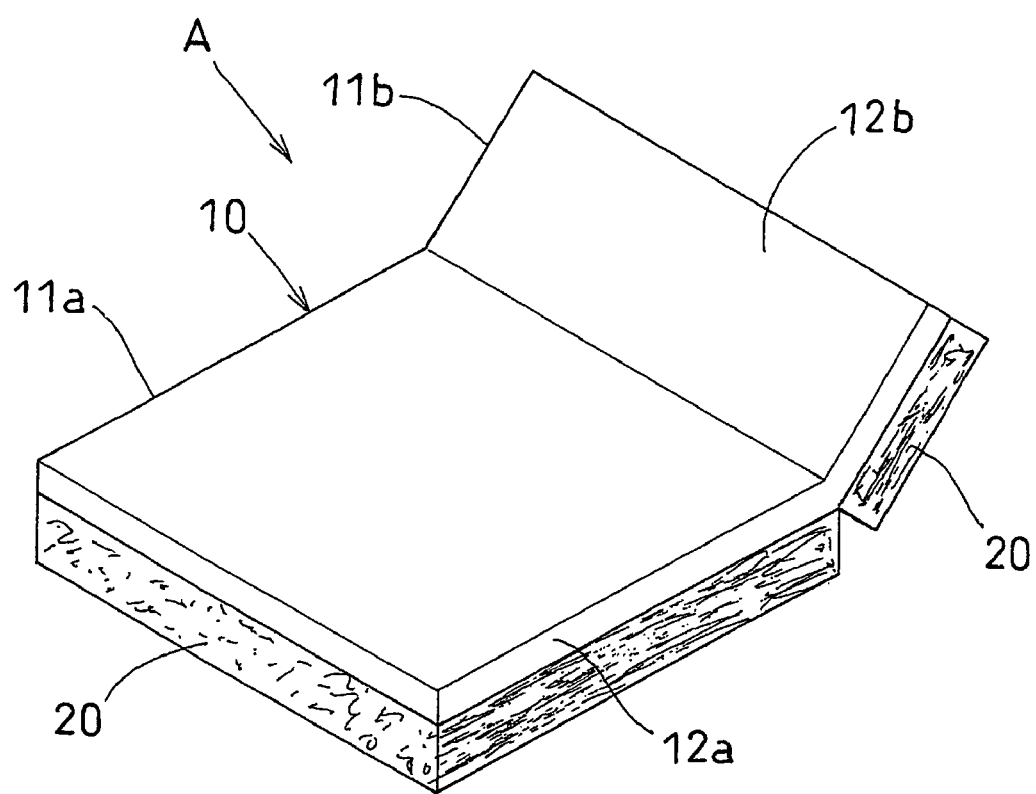
FIG. 1 is a perspective view of one mode of a floor spacer for a vehicle according to the present invention seen from a front side.
Figure 2:
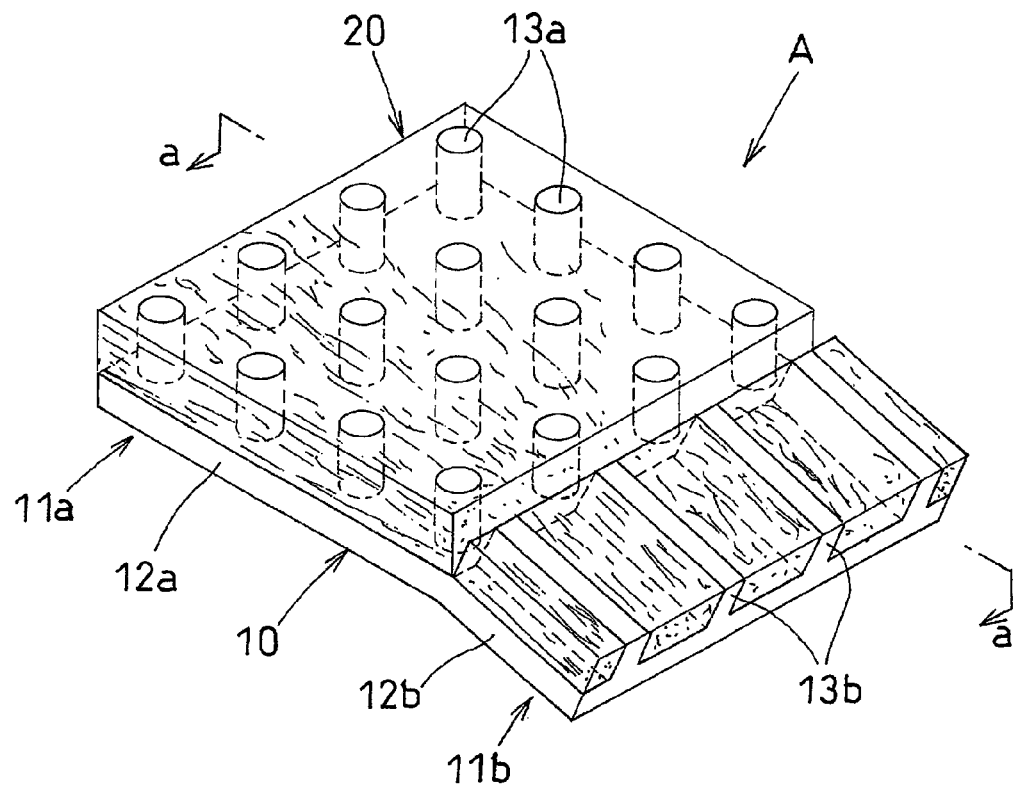
FIG. 2 is a perspective view of the floor spacer for a vehicle shown in FIG. 1 seen from a rear side.
Figure 3:
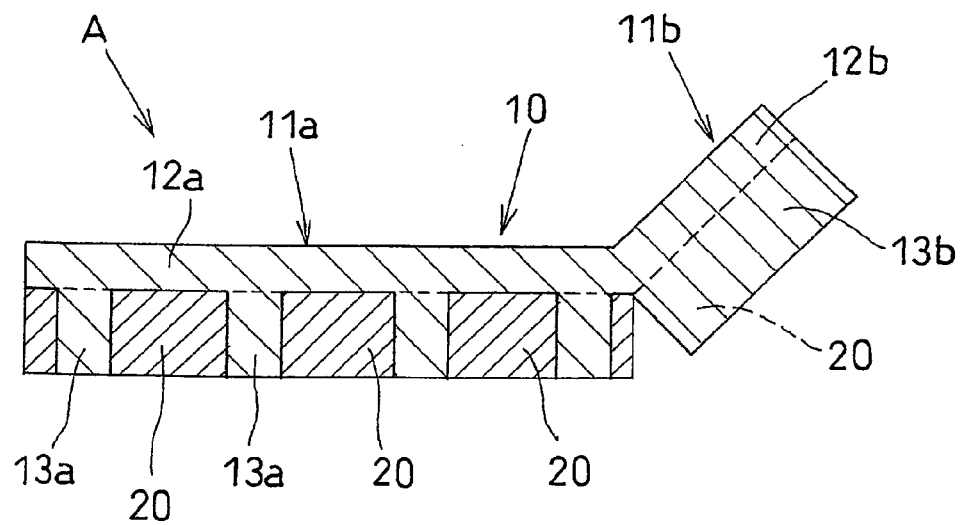
FIG. 3 is a sectional view taken along the a-a line of FIG. 2.

Hereinafter, the present invention will be described based on an embodiment with reference to the drawings. FIG. 1 is a perspective view of one mode of a floor spacer for a vehicle according to the present invention seen from a front side, FIG. 2 is a perspective view of the floor spacer for a vehicle shown in FIG. 1 seen from a rear side, FIG. 3 is a sectional view taken along the a-a line of FIG. 2, and FIG. 4 is a view for explaining the assembling state of the floor spacer for a vehicle shown in FIG. 1.

A floor spacer A for a vehicle is constituted of a floor spacer main body 10 and a sound absorbing material 20. The floor spacer main body 10 is an expanded resin molded article obtained by internal die expansion molding of pre-expanded beads of, for example, a styrene-modified polyethylene resin.

Figure 4:
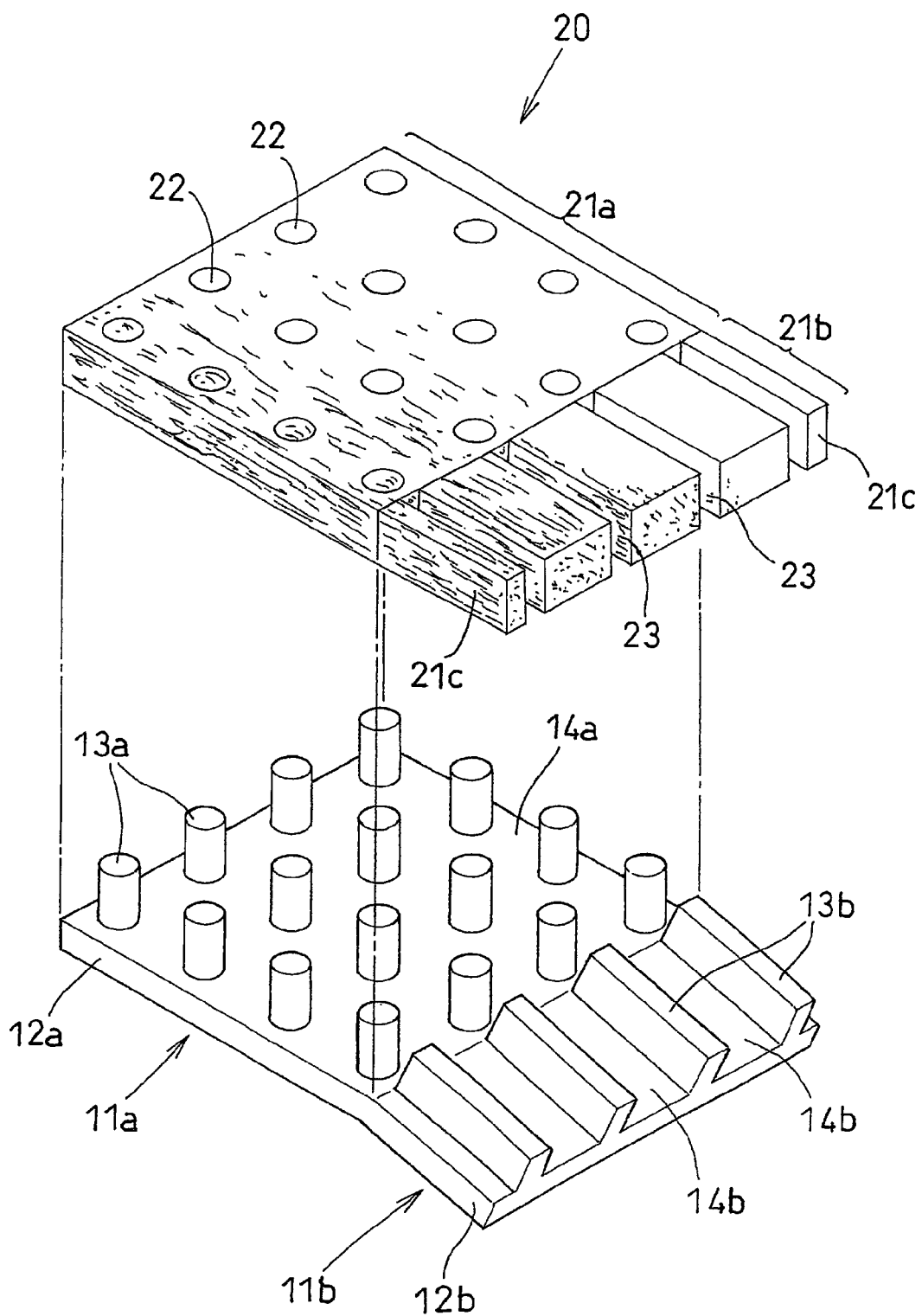
FIG. 4 is a view for explaining the assembling state of the floor spacer for a vehicle shown in FIG. 1.

In the example shown in the drawing, the floor spacer main body 10 is constituted of a horizontal portion 11a and an inclined portion 11b located at the tip end of the horizontal portion 11a, and as shown in detail in FIG. 4, the horizontal portion 11a and the inclined portion 11b are both constituted of flat plate portions 12a and 12b and a plurality of ridges 13a and 13b integrally molded on the back surface side of the flat plate portions 12a and 12b. In the example shown in the drawing, the ridges 13a at the side of the flat plate portion 12a are 16 cylindrical bodies, and the ridges 13b at the side of the flat plate portion 12b are four rectangular solids.

The floor spacer A for a vehicle is accommodated and placed in a recessed groove existing in a vehicle frame not illustrated. On this occasion, the aforesaid horizontal portion 11a of the floor spacer main body 10 functions mainly as a bulking material to assure that the floor surface becomes a flat surface. The inclined portion 11b is the place where the feet of an occupant are placed during driving, and functions as a pad for absorbing an impact on leg portions of the occupant.

The total area of the ridges 13a with respect to the flat plate portion 12a is set in consideration of the mounted load to the horizontal portion 11a when the floor spacer 10 for a vehicle is placed in the vehicle, and the total area of the ridges 13b with respect to the flat plate portion 12b is set so as to be capable of effectively absorbing the impact load occurring to the inclined portion 11b at the time of collision or the like. The design concept is already known as described in the aforementioned Patent Document 1, and when the ridges 13a and 13b are formed based on the design concept, spaces 14a and 14b are formed between the ridges on the back surface sides of the flat plate portions 12a and 12b.

The horizontal portion 11a and the inclined portion 11b may have the same expansion ratios, but since the inclined portion 11b receives a large impact load, they may be molded with different expansion ratios so as to be able to absorb it effectively. In such a case, as the pre-expanded beads for the inclined portion 11b, the pre-expanded beads at a lower ratio as compared with the pre-expanded beads of the horizontal portion 11a are used, a partition wall is provided in advance in the vicinity of the boundary of the horizontal portion 11a and the inclined portion 11b inside the molding cavity so that both particles do not mix with each other, the pre-expanded beads are simultaneously filled in the respective cavities which are partitioned, the partition wall is quickly removed from the inside of the cavity after filling, and internal die expansion molding is performed, whereby the floor spacer main body 10 with different expansion ratios between the horizontal portion 11a and the inclined portion 11b can be molded.

In the floor spacer A for a vehicle according to the present invention, a sound absorbing material 20 such as, for example, felt, a polyurethane foam or non-woven fabric is buried in the spaces 14a and 14b between the aforementioned ridges 13a and 13b of the floor spacer main body 10, and the layer constituted of the sound absorbing material is formed. In the example shown in FIGS. 1 to 4, the thickness of the sound absorbing material 20 is substantially the same as the height of the ridge 13a in the horizontal portion 11a, and is substantially the same as the height of the ridge 13b in the inclined portion 11b.

In a region 21a of the sound absorbing material 20 corresponding to the horizontal portion 11a, through-holes 22 each with a diameter slightly smaller than the diameter of the ridge 13a are formed in the spots corresponding to the ridges 13a, and as shown in FIG. 4, by press-fitting the sound absorbing material 20 from the back surface of the floor spacer main body 10, the aforementioned region 21a of the sound absorbing material 20 enters the aforementioned spaces 14a so as to fill all the spaces 14a, and forms a layer constituted of the sound absorbing material. The sound absorbing material 20 is held in the position by contact between the sound absorbing material 20 and the ridges 13a.

A region 21b of the sound absorbing material 20 corresponding to the inclined portion 11b partly continues to the aforementioned region 21a, and cutouts 23 each with a slightly narrower width than the lateral width of the ridge 13b are formed at the spots corresponding to the ridges 13b of the inclined portion 11b. By press-fitting the region 21b between the ridges 13b, the aforementioned region 21b enters the aforementioned spaces 14b to fill the aforementioned spaces 14b, and forms a layer constituted of the sound absorbing material. Here, the sound absorbing material 20 is held in the position by only the contact between the sound absorbing material 20 and the ridges 13b. Portions 21c and 21c located at both sides of the region 21b may be attached by using the adhesive supplementally when required.

The state after the sound absorbing material 20 is thus mounted to the floor spacer main body 10 is shown in FIGS. 1 to 3. As shown in the drawings, the sound absorbing material 20 is all accommodated in the spaces between the ridges, and on the back surface of the floor spacer A for a vehicle, the lower end portions of the ridges 13a and 13b of the floor spacer main body 10 are exposed. When the floor spacer A for a vehicle is accommodated and placed in the recessed groove existing in the floor frame of the vehicle, the exposed lower end surfaces of the ridges 13a and 13b are directly in contact with the floor frame to be the support surfaces for the mounted load.

As described above, in the floor spacer A for a vehicle according to the present invention, the constitution in which a plurality of ridges 13a and 13b are vertically provided on the back surface of the floor spacer main body 10 so as to have a desired contact area is adopted, and compression strength can be simultaneously satisfied while reduction in weight is satisfied. Further, the layers constituted of the sound absorbing material 20 are formed in the spaces 14a and 14b formed between the ridges to fill the spaces, and the layers function as the sound absorbing walls. Therefore, the high sound absorbing performance for the vehicle interior can be ensured.

In the example shown in FIGS. 1 to 4, the sound absorbing material 20 is also disposed on the back surface of the inclined portion 11b, but depending on the required sound absorbing performance level, the sound absorbing material 20 in this region may be omitted. Further, only the portions 21c and 21c located at both sides of the region 21b of the sound absorbing material 20 may be omitted. In any case, when the floor spacer A for a vehicle is discarded or the like, the floor spacer main body 10 and the sound absorbing material 20 of different kinds of materials can be easily separated and collected.

The floor spacer main body 10 may have only the horizontal portion 11a, or may have only the inclined portion 11b. The floor spacer main body in a rectangular shape as a whole is one example, and the floor spacer main body 10 in a suitable shape is used in accordance with the shape of the recessed groove or the like formed in the floor frame. In order to increase the force to contact the sound absorbing material 20, the recesses and projections may be formed on the peripheral surfaces of the ridges 13a and 13b. The ridge 13b which is formed on the inclined portion 11b may be in a cylindrical shape as the ridge 13a. Further, the horizontal sectional shapes of the ridges 13a and 13b may be rectangular or oblong.

Figure 5:
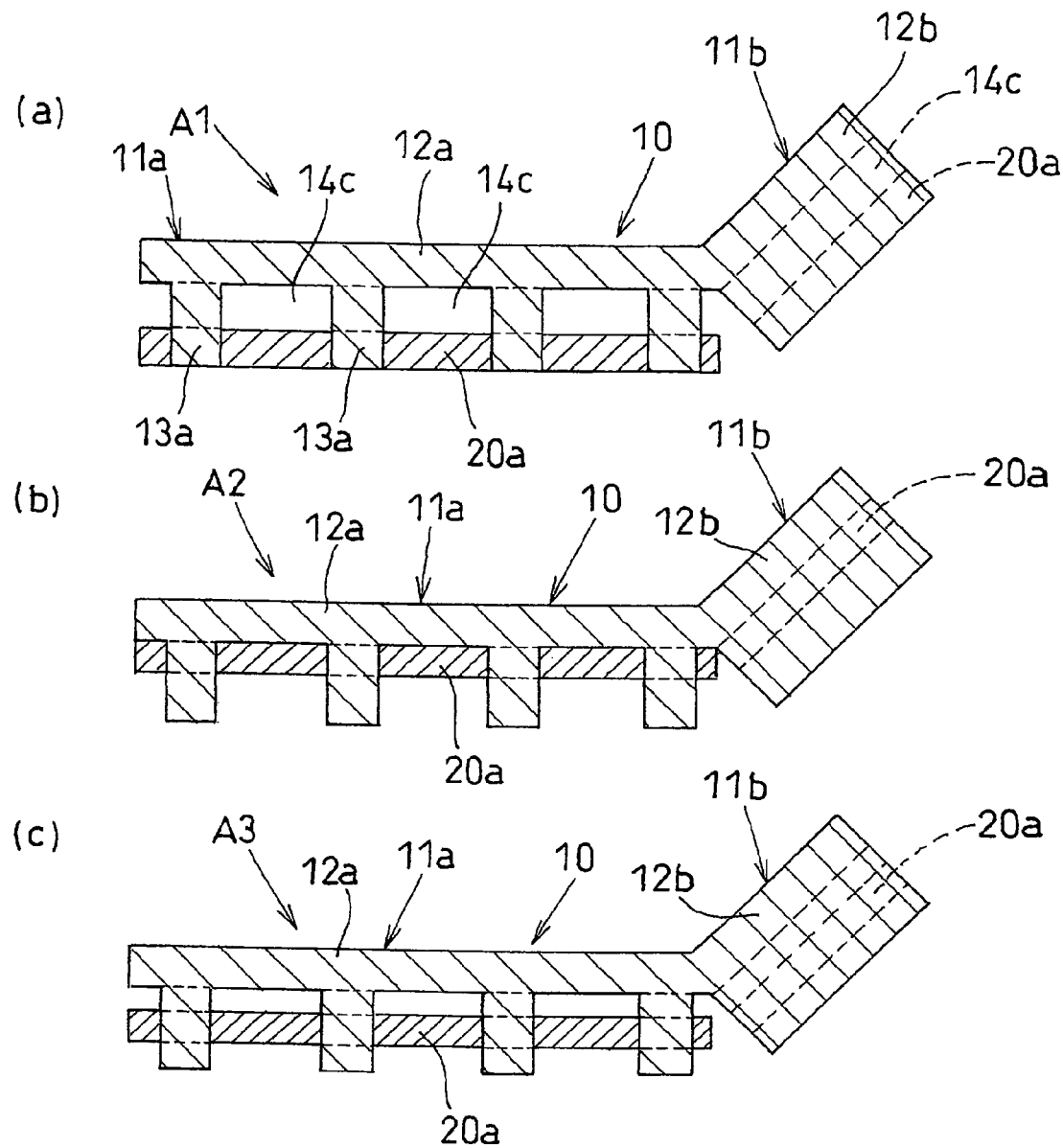
FIG. 5a to FIG. 5c are views corresponding to FIG. 3, showing another embodiment of the floor spacer for a vehicle according to the present invention.

FIG. 5 shows a view corresponding to FIG. 3, showing another embodiment of the floor spacer A for a vehicle according to the present invention. This differs from the floor spacer A for a vehicle shown in FIGS. 1 to 4 in the point that the layer constituted of the sound absorbing material 20 is formed to fill a part instead of all of the spaces 14a and 14b formed between the ridges 13a and 13b. The floor spacer for a vehicle of this mode can be effectively used when the sound absorbing material 20 has high sound absorbing performance, or when high sound absorbing performance is not required from the vehicle.

In a floor spacer A1 for a vehicle of FIG. 5a, a sound absorbing material 20a with a small thickness is located only in the vicinity of the lower ends of the ridges 13a and 13b, and spaces 14c remain between the flat plate portions 12a and 12b of the floor spacer main body 10 and the sound absorbing material 20a. The spaces 14c function as sound absorbing chambers. In a floor spacer A2 for a vehicle of FIG. 5b, the sound absorbing material 20a with a small thickness is located to be in contact with the back surfaces of the flat plate portions 12a and 12b of the floor spacer main body 10. In a floor spacer A3 for a vehicle of FIG. 5c, the sound absorbing material 20a with a small thickness is located at the intermediate height of the ridges 13a and 13b.

Figure 6:
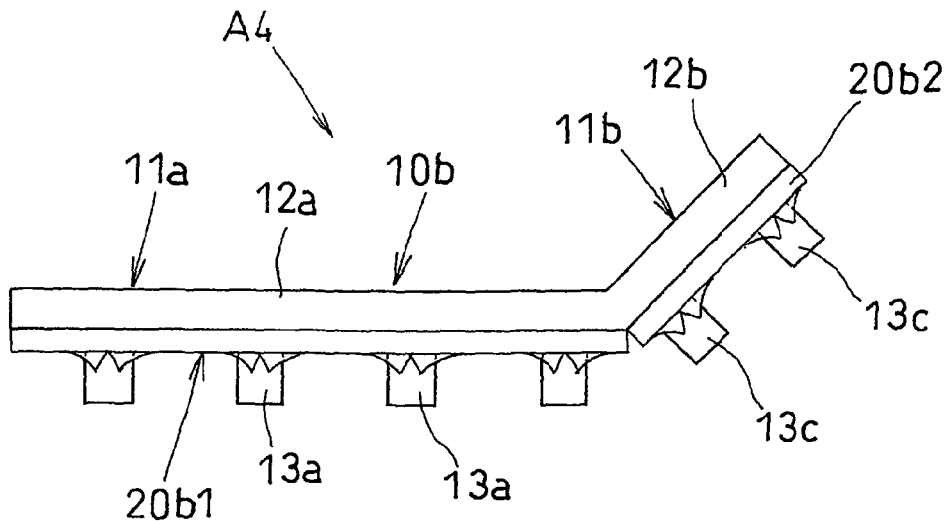
FIG. 6a is a side view showing still another embodiment of the floor spacer for a vehicle according to the present invention.
FIG. 6b is a plane view showing a sound absorbing material used there.
Figure 6:
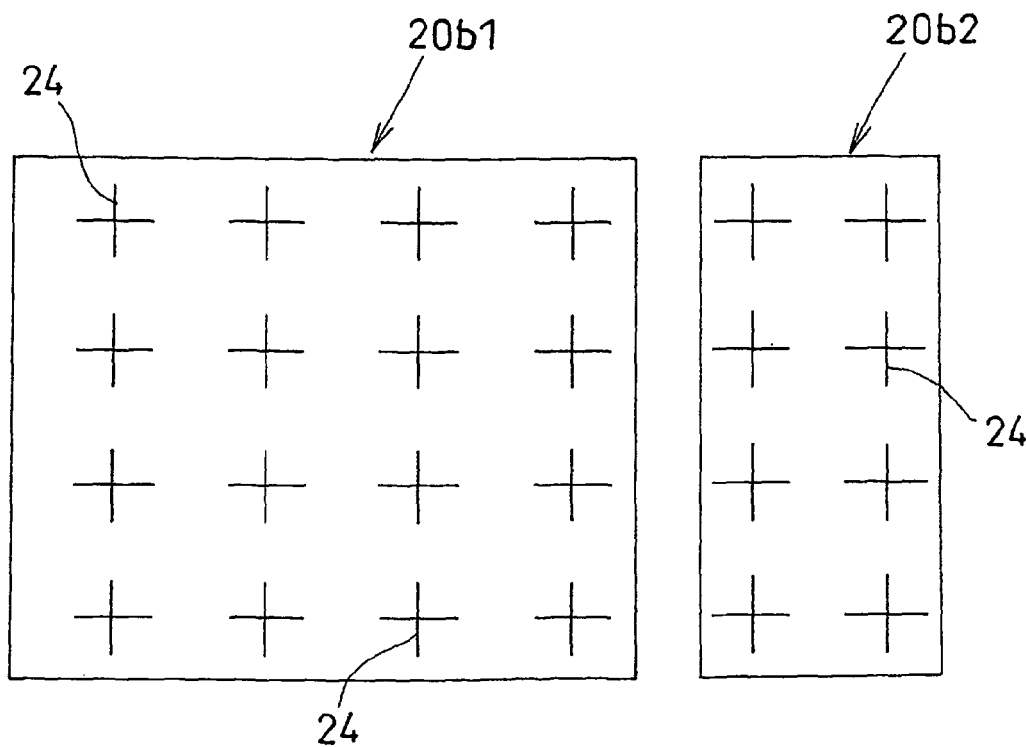

FIG. 6 shows still another embodiment of the floor spacer A for a vehicle according to the present invention. In this case, as the floor spacer main body 10b, the floor spacer main body 10b in which the ridge formed on the back surface of the flat plate portion 12b of the inclined portion 11b is a cylindrical ridge 13c is used, and as shown in FIG. 6, as the sound absorbing material 20b, the one in which cross cut lines 24 are formed at the spots corresponding to the respective ridges 13a and 13c is used. In the drawing, a sound absorbing material 20b1 corresponding to the horizontal portion 11a and a sound absorbing material 20b2 corresponding to the inclined portion 11b are shown as being separated, but they may continue to each other.

By press-fitting the sound absorbing material 20b by matching the positions of the cut lines 24 with the positions of the ridges 13a and 13c, the floor spacer A4 for a vehicle as shown in FIG. 6a is completed. In this mode, the frictional force between the ridges 13a and 13c and the sound absorbing material 20b becomes larger, and the embedding state of the sound absorbing material 20b is further stabilized.

Figure 7:
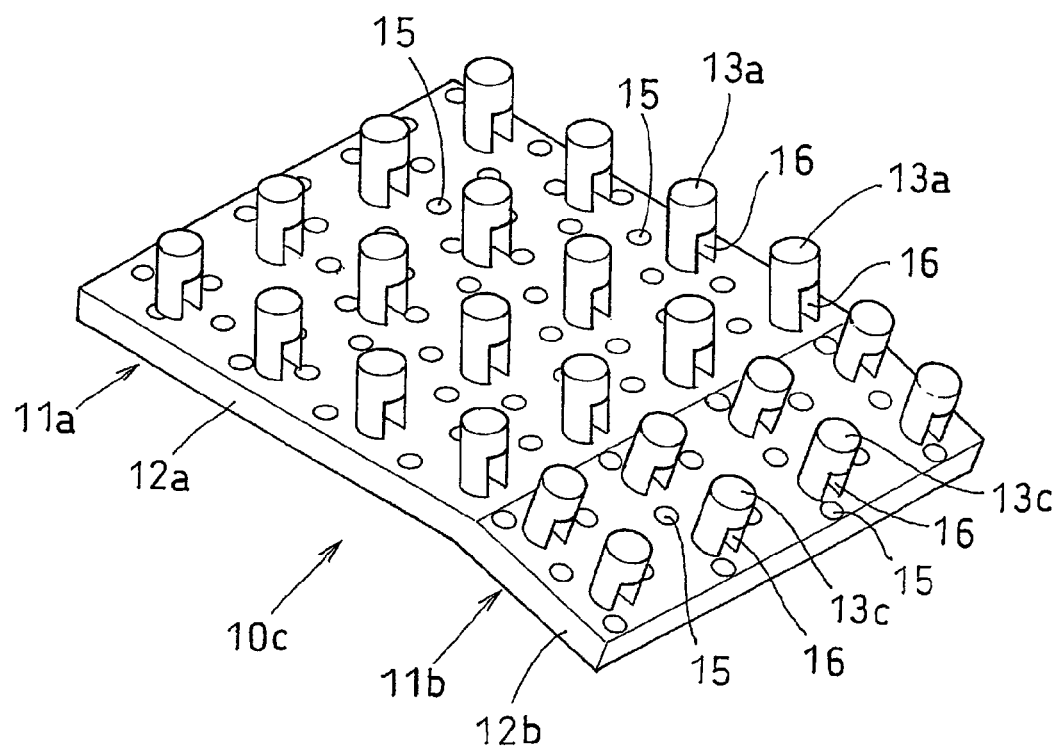
FIG. 7 is a view showing a floor spacer main body used in still another embodiment of the floor spacer for a vehicle according to the present invention.
Figure 8:
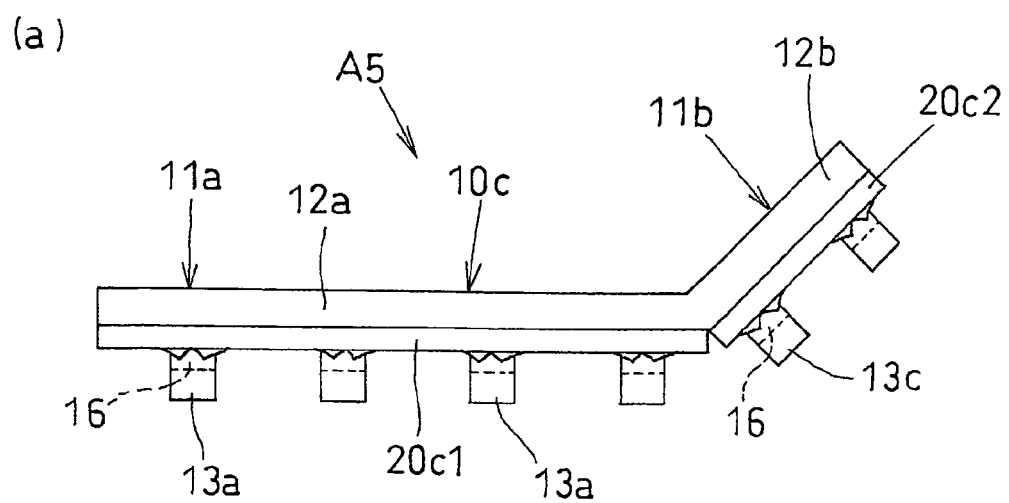
FIG. 8a is a side view showing still another embodiment of the floor spacer for a vehicle according to the present invention using the floor spacer main body shown in FIG. 7.
FIG. 8b is a plane view showing a sound absorbing material used there.
Figure 8:
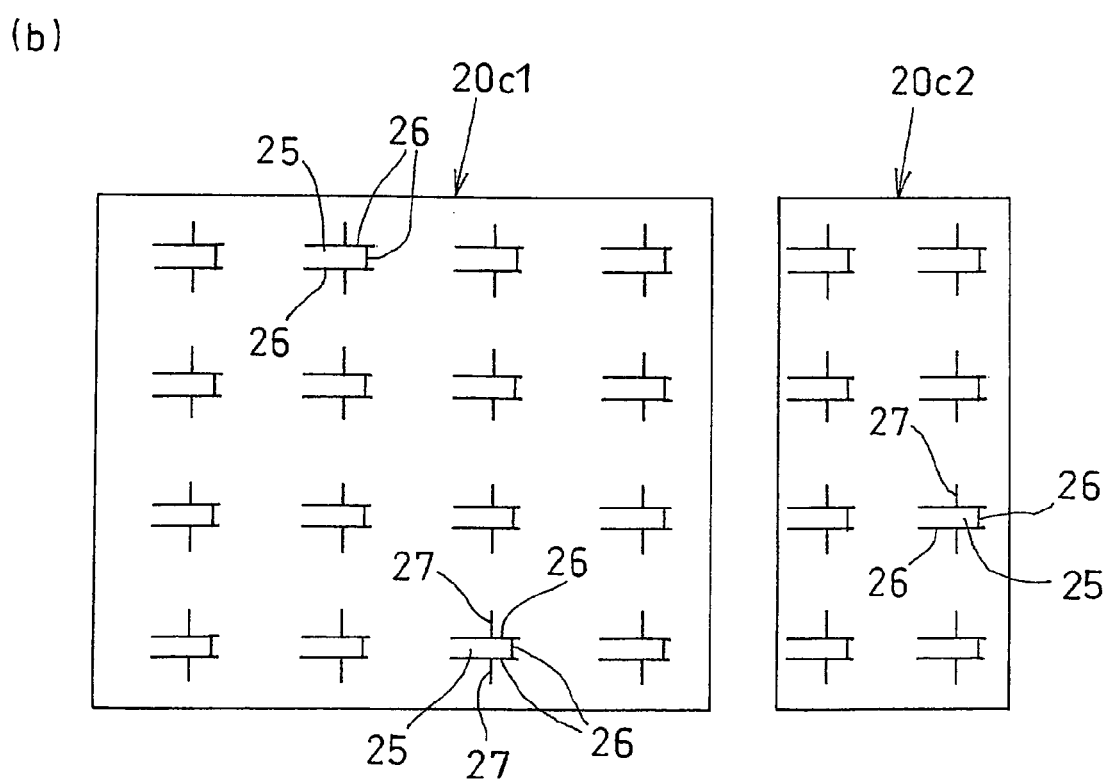
Figure 9:
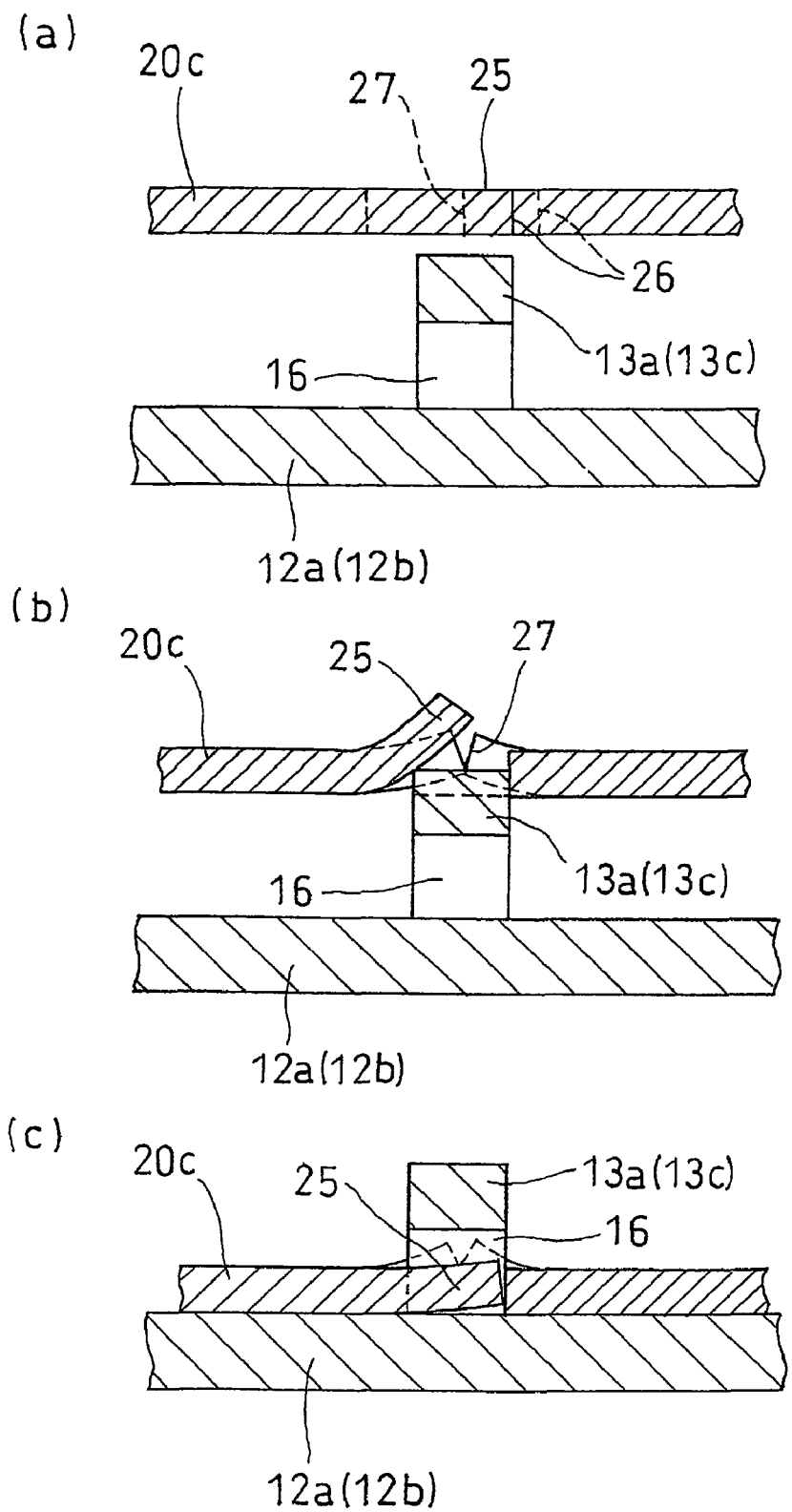
Figure 10:
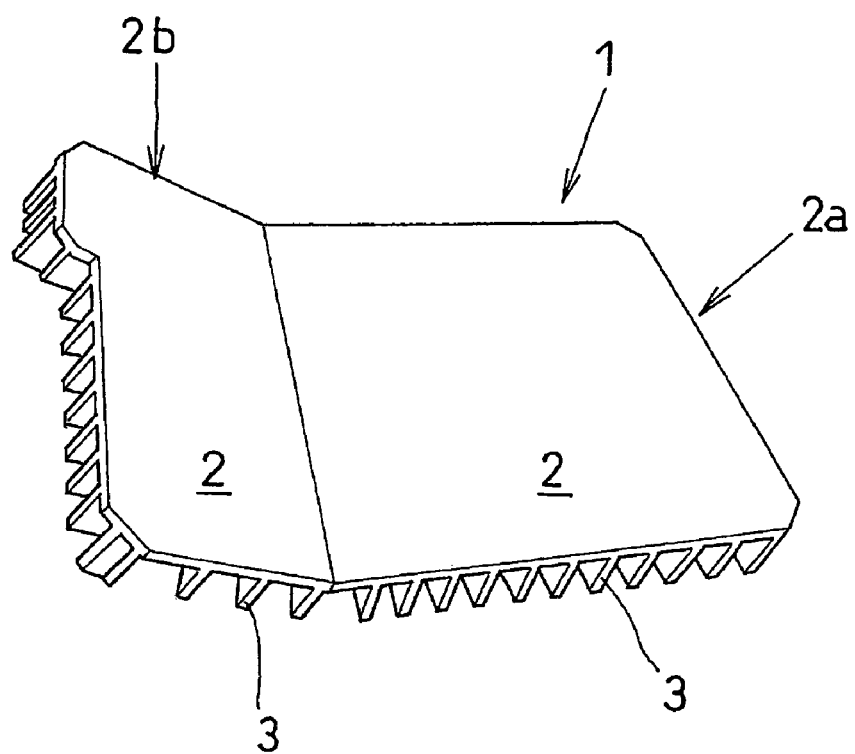
FIG. 10 is a view showing one example of the conventional floor spacer for a vehicle.

FIGS. 7 to 9 show still another embodiment of the floor spacer A for a vehicle according to the present invention. In this case, as a floor spacer main body 10c, a floor spacer main body 10c in which a number of through-holes 15 are formed in the aforementioned flat plate portions 12a and 12b, and fastening holes 16 extending in the direction along the flat plate portions 12a and 12b (the direction parallel with the flat plate portion) are formed in the cylindrical ridges 13a and 13c formed on the back surfaces of the flat plate portions 12a and 12b is used. In the example shown in the drawings, the fastening holes 16 are formed in all the ridges 13a and 13c, but they may be formed in only some of the ridges. Further, the fastening holes 16 may penetrate through the ridges 13a and 13c as the ones shown in the drawings, or one ends may be closed.

Further, as shown in FIG. 8b, as the sound absorbing material 20c, the one in which tongue pieces 25 each in a size and shape capable of being inserted into the aforementioned fastening hole 16 are formed by cut lines 26 at the spots corresponding to the respective ridges 13a and 13c is used. Reference numeral 27 also denotes a cut line formed in accordance with necessity. In the drawing, a sound absorbing material 20c1 corresponding to the horizontal portion 11a and a sound absorbing material 20c2 corresponding to the inclined portion 11b are shown as being separated, but in this case, they may continue to each other.

When the sound absorbing material 20c is mounted to the floor spacer main body 10c, the positions of the tongue pieces 25 which are formed by the cut lines 26 are matched with the positions of the ridges 13a and 13c as shown in FIG. 9a. In this state, the sound absorbing material 20c is pressed to the cylindrical ridges 13a and 13c. Thereby, as shown in FIG. 9b, the sound absorbing material 20c gradually enters downward with the tongue pieces 25 pushed up with the tip ends of the ridges 13a and 13c. When the sound absorbing material 20c lowers by a certain distance, the tongue pieces 25 in the raised posture by being pushed up enters the aforementioned fastening holes 16 as shown in FIG. 9c. When needed, the tongue pieces 25 which are in the raised posture are pressed into the aforementioned fastening holes 16, whereby the tongue pieces 25 are in the posture in which they enter the fastening holes 16. Thereby, as shown in FIG. 8a, a floor spacer A5 for a vehicle according to the present invention is completed.

In the floor spacer A5 for a vehicle, the tongue pieces 25 which enter the fastening holes 16 formed in the cylindrical ridges 13a and 13c function as resistors, the mounting state of the sound absorbing material 20c to the floor spacer main body 10c is more stabilized, and dropping of the sound absorbing material 20c due to vibration and the like can be reliably inhibited. Further, by forming a number of through-holes 15 in the floor spacer main body 10c, the noise on the inner side of the compartment can be absorbed with the layer constituted of the sound absorbing material 20c by allowing the noise to pass through the aforementioned through-holes 15, and the sound absorbing performance of the floor spacer A5 for a vehicle with respect to the compartment interior sound is enhanced.

The floor spacer main body 10c shown in FIGS. 7 to 9 has both the through-holes 15 and the fastening holes 16 formed in the cylindrical ridges 13a and 13c, but the through-holes 15 may be omitted. Further, the through-holes can be similarly formed in the flat plate portions 12a and 12b in the floor spacer main bodies 10 and 10b in any of the modes shown in FIGS. 1 to 6, and in such a case, the sound absorbing performance of the floor spacer for a vehicle with respect to the compartment interior sound is enhanced.

The invention claimed is:

1. A floor spacer for a vehicle which is accommodated and placed in a recessed groove existing in a floor frame of a vehicle, characterized by comprising at least:

a floor spacer main body constituted of an expanded resin molded article having a flat plate portion to be on an inner side of a compartment, and a plurality of ridges vertically provided at a back surface of said flat plate portion, each one of the plurality of ridges having a ridge thickness; and a layer constituted of a sound absorbing material disposed to fill a space formed between said ridges, the sound absorbing material having a sound absorbing material thickness, wherein the sound absorbing material thickness is less than or equal to the ridge thickness and wherein a plurality of through-holes are formed in said flat plate portion in the floor spacer main body.

2. The floor spacer for a vehicle according to claim 1, characterized in that fastening holes in a direction along the flat plate portion are formed in all or some of said plurality of ridges in the floor spacer main body.

3. The floor spacer for a vehicle according to claim 2, characterized in that a part of the layer constituted of the sound absorbing material enters said fastening hole formed in said ridge.

4. The floor spacer for a vehicle according to claim 1, characterized in that the layer constituted of the sound absorbing material is formed to fill all or some of spaces formed between the ridges.

5. The floor spacer for a vehicle according to claim 1, characterized in that the sound absorbing material is at least one of felt, a polyurethane foam and a non-woven fabric.

\* \* \* \* \*